(12) United States Patent
Larson et al.

(10) Patent No.: US 7,283,686 B2
(45) Date of Patent: Oct. 16, 2007

(54) IMAGE PROCESSOR

(75) Inventors: Bradley R. Larson, Meridian, ID (US); Rick P. Hoover, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 885 days.

(21) Appl. No.: 10/413,275

(22) Filed: Apr. 14, 2003

(65) Prior Publication Data
US 2004/0202383 A1  Oct. 14, 2004

(51) Int. Cl.
*G06K 9/54* (2006.01)
*G06K 9/60* (2006.01)

(52) U.S. Cl. ..................... 382/303; 382/307

(58) Field of Classification Search ........... 382/303, 382/232, 233, 234, 307, 302
See application file for complete search history.

(56) References Cited

U.S. PATENT DOCUMENTS

| | | | |
|---|---|---|---|
| 5,701,479 A | 12/1997 | Venable et al. | |
| 5,721,958 A | 2/1998 | Kikinis | |
| 5,852,742 A | 12/1998 | Vondran, Jr. et al. | |
| 6,002,814 A | 12/1999 | Chadez | |
| 6,072,916 A | 6/2000 | Suzuki | |
| 6,471,332 B1 | 10/2002 | Vilanova et al. | |
| 2003/0189571 A1* | 10/2003 | MacInnis et al. | 345/505 |

* cited by examiner

*Primary Examiner*—Yon J. Couso

(57) ABSTRACT

In one embodiment, an image processor includes a plurality of processing pipelines, each configured to receive data associated with a portion of an image and to output pulse data associated with the portion of the image. A buffer is configured to store the pulse data. Logic is configured to route the pulse data to an appropriate laser drive unit.

27 Claims, 4 Drawing Sheets

IMAGE PROCESSOR

BACKGROUND

High-output imaging devices are distinguished from lower-output imaging devices in part by their much higher rates of video data consumption. To supply video data at much higher rates, very complex and expensive hardware video processing pipelines may be implemented. Such hardware pipelines are able to supply data at the rates sufficient to sustain the higher output of the high-output imaging device.

In part because of the possibility that smaller numbers of high-output print devices may be manufactured and sold, the cost of the hardware video processing pipelines contained in such devices may be high. Additionally, such higher speed imaging devices may not have some of the refinements built into high production volume, lower-cost, lower-speed video pipelines. The addition of such refinements to high-output print devices may not be cost-effective, in view of the expected low production volumes associated with such expensive higher speed devices. Therefore, higher-output video pipelines may be more expensive and less full-featured due to their low expected production volumes.

SUMMARY

In one embodiment, an image processor includes a plurality of processing pipelines, each configured to receive data associated with a portion of an image and to output pulse data associated with the portion of the image. A buffer is configured to store the pulse data. Logic is configured to route the pulse data to an appropriate laser drive unit.

BRIEF DESCRIPTION OF THE DRAWINGS

The same reference numbers are used throughout the drawings to reference like features and components.

DETAILED DESCRIPTION

Figure 1:
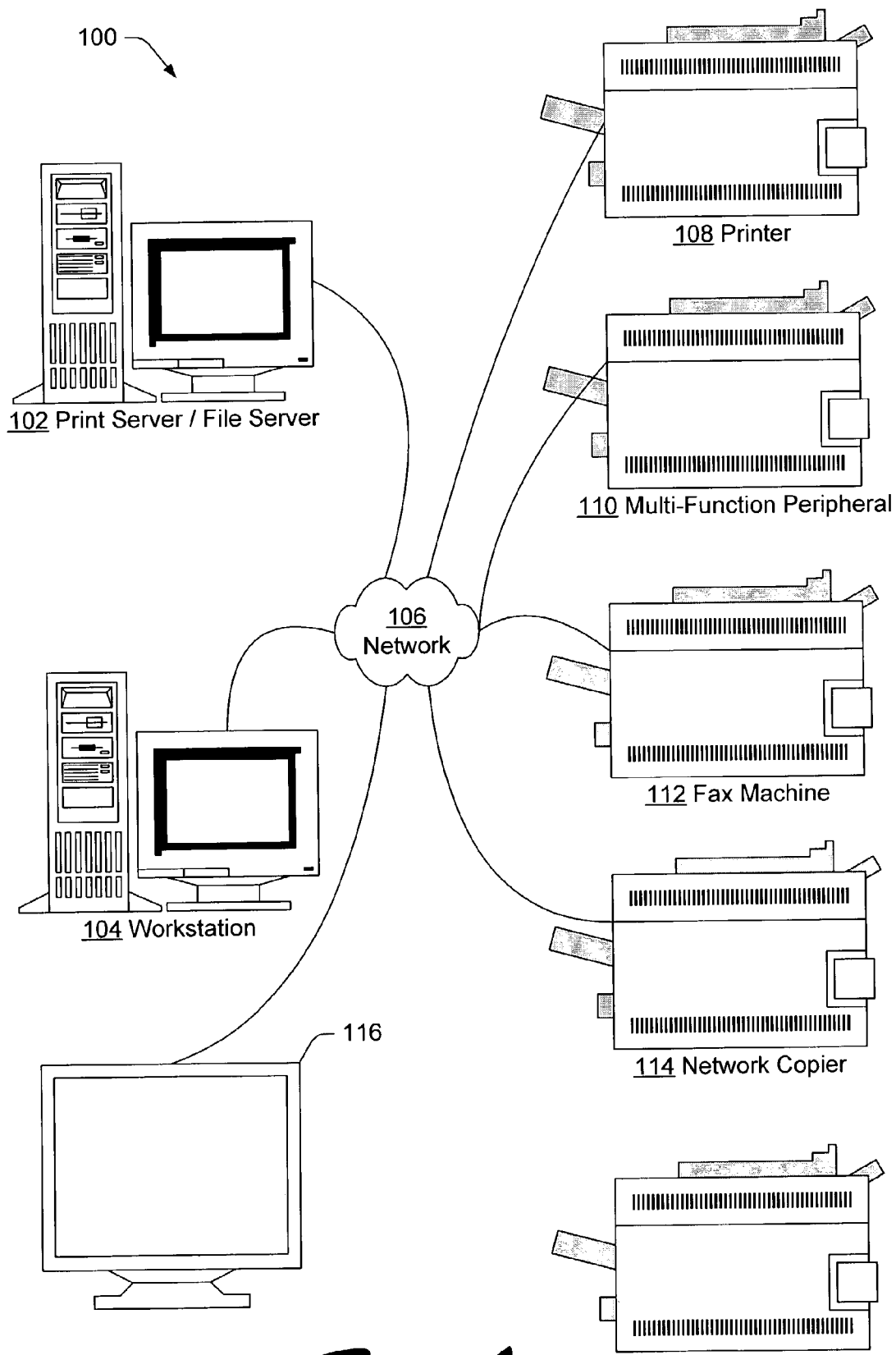
FIG. 1 is a diagram showing an environment in which exemplary imaging devices may operate.

FIG. 1 shows an environment 100 in which exemplary imaging devices 108-118, having imaging processors embodying a version of parallel image processing, may operate. A print server or file server 102 is configured to receive a print or display job, from any of a plurality of workstations 104 or other content providers. The job may be sent over a network 106 to any type of imaging device, such as a printer 108, multifunctional peripheral 110, fax machine 112, network copier 114, display screen 116 or other printing or imaging device. While exemplary display screen 116 is illustrated as receiving content over the network 106, it could alternatively receive content through a direct connection with a computer 102-104. A copy machine 118, while not connected to network 106, represents another imaging device configured for operation of a version of parallel image processing.

Figure 2:
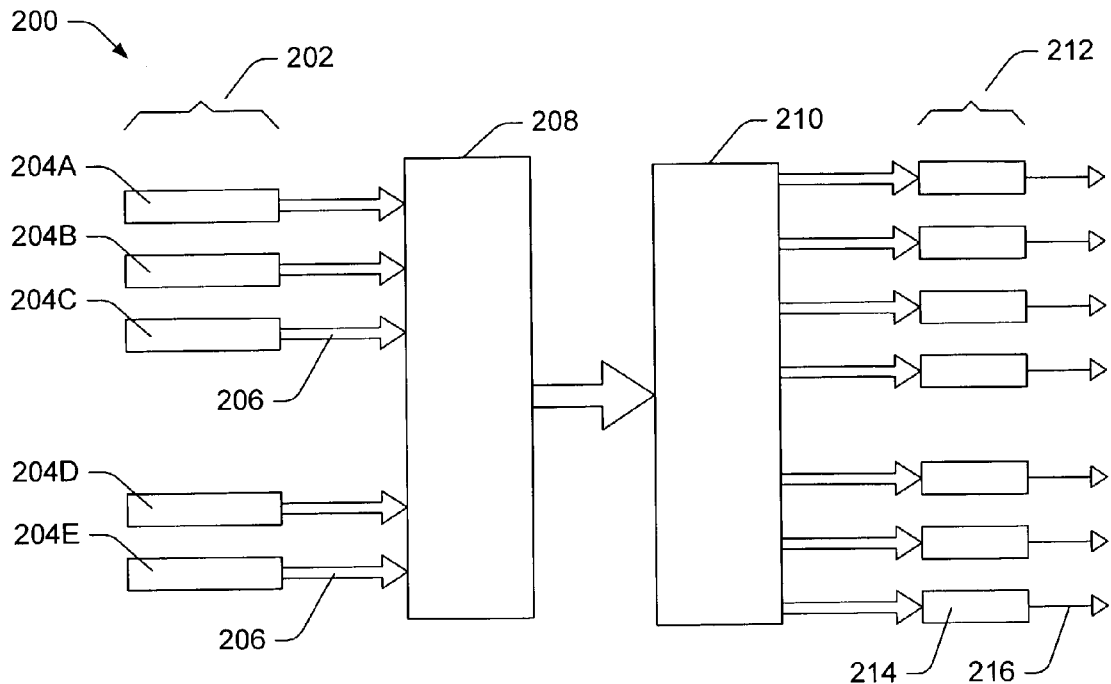
FIG. 2 is an illustration of a first possible implementation of an image processor.

FIG. 2 is an illustration of a first possible implementation of a parallel image processor 200 configured to receive compressed device independent raster data and to output color pulse data to control a plurality of lasers. A plurality of video or processing pipelines 202 receives compressed device independent raster data. In particular, each video pipeline 204 is associated with a different swath, image segment, or segment or portion of an image. For example, where the image represents a page to be printed, the swath may represent a horizontal band approximately one-inch high and 8.5 inches in width. Therefore, each video pipeline 204 converts compressed device independent raster data associated with a swath of an image into output color pulse data 206 suitable for transmission to a video or laser unit for operation of a laser, ink jet or other output device.

A buffer 208 receives and stores the color pulse data 206 output from the plurality of video pipelines 202. Data reorder logic 210, configured within an ASIC (application specific integrated circuit) or similar device, reads color pulse data from the buffer 208 and sends the color pulse data to a plurality of video units 212. Each video unit 214 within the plurality of video units 212 controls the operation of one or more output devices. The output devices may include laser beams 216, ink jet nozzles or other devices which are used in the page or media marking assembly of hard-copy imaging devices. Similarly, the output devices may include screen controlling devices, such as an electron gun/beam in a CRT (cathode ray tube), or a screen controlling device in a plasma screen or similar imaging device 470.

The number of video pipelines 204 generally corresponds to the overall rate of color pulse data consumption and the ability of each video pipeline to produce data. The number of video units 214 driving laser beams 216 or ink jet nozzles, etc., is based upon performance characteristics of the marking assembly. As a result, the number of video pipelines 204 does not have to be the same as the number of laser-driving video units 214, and no particular relationship between these numbers is required.

Figure 3:
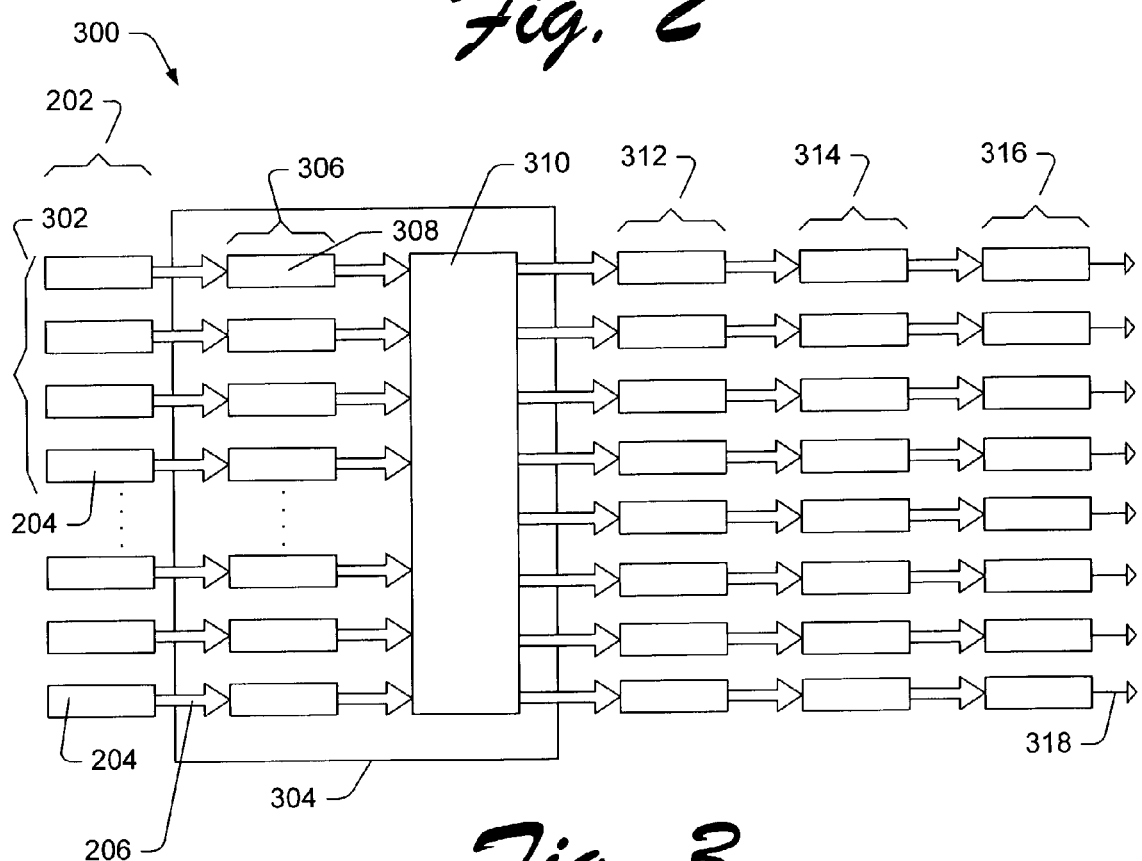
FIG. 3 is an illustration of a second possible implementation of an image processor.

FIG. 3 is an illustration of a second possible implementation of a parallel image processor 300. A plurality of video pipelines 202 receives compressed device independent raster data. The plurality of video pipelines 202 may be organized within one or more ASICs. For example, a group 302 of four video pipelines 204 may be configured within an ASIC. Each video pipeline 204 converts compressed device independent raster data associated with a swath of an image into output color pulse data 206 suitable for transmission to a video unit for operation of a laser. The color pulse data 206 is sent to a gate array 304, within which is a column 306 of DMAs 308 and a cross-switching logic device 310. Each DMA 308 is configured to receive the color pulse data 206 from one video pipeline 204 and to manage the transmission of that data to the cross-switching logic device 310. The cross-switching logic device 310 transfers color pulse data to a plurality of memory devices 312 such that the data queues up in the memory devices for the laser channel that will ultimately consume it, or transfers the color pulse data to a memory device organized to provide a plurality of locations within which the color pulse data may be stored. A plurality of DMAs 314 manages the color pulse data stored in the plurality of memory devices 312, or equivalent memory device(s). The plurality of DMAs 314 transmits color pulse data to a plurality of lasers or laser driver units 316, which manage the laser beams 318 employed by the marking assembly.

Figure 4:
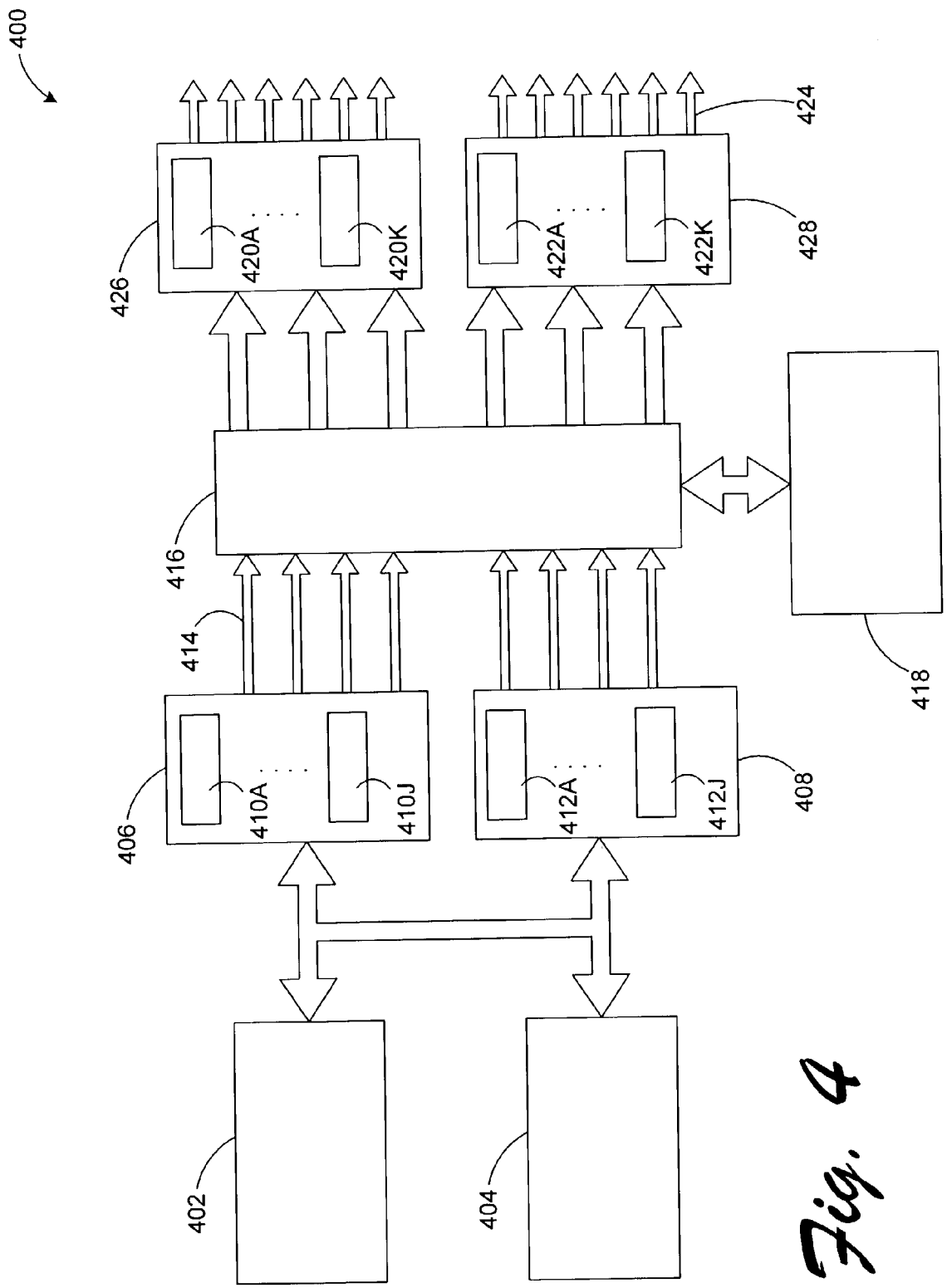
FIG. 4 is an illustration of a third possible implementation of an image processor.

FIG. 4 is an illustration of a third possible implementation of an image processor 400. A networking ASIC 402 or similar networking device is configured to receive compressed device independent raster data from a source, such as network 106. A memory device 404 is configured to buffer compressed device independent raster data received from the ASIC 402. For example, a 256 megabyte SDRAM may provide a ten-sheet buffer.

The compressed device independent raster data is sent to one or more ASICs 406, 408 each configured to include a plurality of video pipelines 410, 412. The video pipelines 410, 412 translate the compressed device independent raster data into color pulse data, which may be sent by each pipeline 410, 412 at 414 to data reorder logic within a device such as a gate array 416. The data sent by each video pipeline 410, 412 includes data associated with a swath of the image processed by the video pipeline. Each swath contains a plurality of lines of color pulse data (i.e. data associated with one line of pixels in the output image). For example, a first pipeline may process lines forming a first swath of the image, while second and possibly additional pipelines may process second and possibly additional swaths forming the image. The data reorder logic 416 buffers the color pulse data within a memory device 418, such as a 256 MB DDRAM. While many implementations of the data reorder logic 416 are possible, in one embodiment the data reorder logic 416 establishes and maintains a buffer (such as a FIFO buffer) in the memory device 418 associated with the output of each video pipeline 410, 412. The data reorder logic then determines the data and timing needs of each video unit 420, 422 as pixels are written to the media in a predetermined order. The appropriate data is then fetched from the appropriate buffer at the appropriate time, and passed to the appropriate video unit 420, 422. According to such an implementation, each line of color pulse data is sent by the data reorder logic 416 to one or more video units 420, 422 configured to drive the lasers 424 within the marking assembly. The video units 420, 422 may be configured within one or more ASICs 426, 428 or within discrete logic, as desired.

An example of this arrangement could include an output device 424 that consumes 60 megapixels/sec. Three video pipelines 410, 412 configured to process 20 megapixels/sec could be used to provide enough combined throughput to satisfy the system needs.

Figure 5:
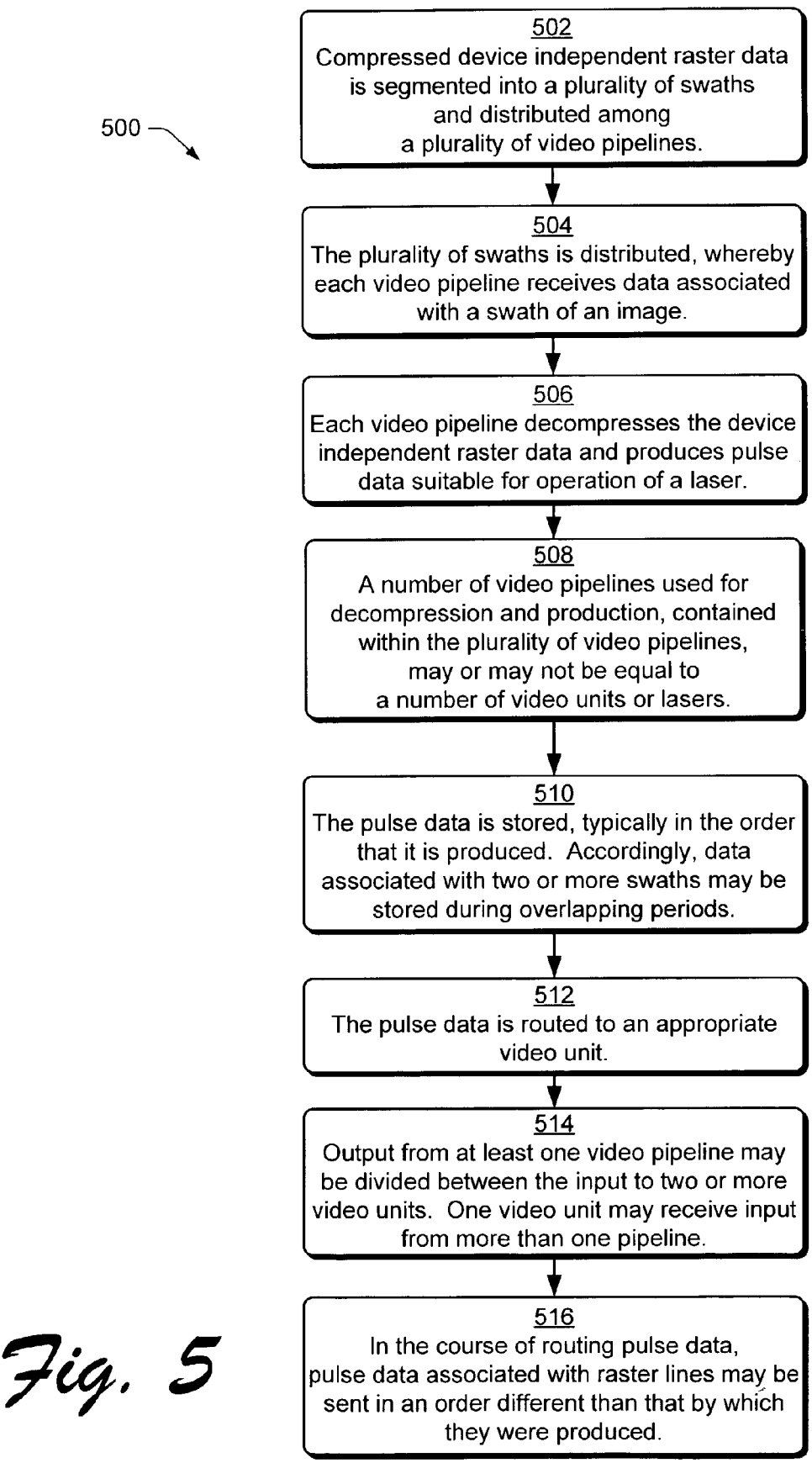
FIG. 5 is a flow diagram that describes an exemplary method by which an image processor may be operated.

FIG. 5 is a flow diagram 500 that describes operation of an exemplary imaging device 108-118. The elements of the method may be performed by any desired means, including the operation of hardware devices, such as ASICs or by the execution of processor-readable instructions defined on a processor-readable media, such as a disk, a ROM or other memory device.

At block 502, compressed device independent raster data is segmented into a plurality of swaths distributed among a plurality of video pipelines. For example, referring to FIG. 4, the networking ASIC 402 and memory device 404 supply the video pipelines 410, 412 within ASICs 406, 408 with compressed device independent raster data.

At block 504, the plurality of swaths is distributed in a manner in which each video pipeline receives data associated with a swath of an image. For example, each video pipeline 410, 412 is associated with a swath of an image to be printed, wherein each swath includes a number of lines of raster data or data associated with rows of pixels within an image to be printed.

At block 506, each video pipeline 410, 412 decompresses the compressed device independent raster data and produces pulse data suitable for operation of a laser (e.g. laser 316 in FIG. 3). The pulse data directs the timing by which the lasers turn on and off (i.e. "pulse"). The pulse data associated with each swath of an image can be segmented for storage according to rows of pixels (i.e. lines of raster data), thereby organizing the color pulse data by raster line for later transmission to an appropriate video unit. As seen at block 508, during the production of color pulse data, the number of video pipelines contained within the plurality of video pipelines producing the pulse data, and the number of video units driving lasers using the pulse data are allowed to differ. Thus, there is no restriction for a video pipeline to produce data at the rate at which it is consumed by a video unit driving one or more lasers or other output device. The aggregate output rate of all the pipelines together is designed to be greater than or equal to the average consumption rate of the marking device as a whole.

At block 510, the pulse data is stored until needed. Typically, data is stored in the order that it is produced, rather than the order used by the lasers. Thus, the data associated with two or more swaths may be stored during overlapping periods, i.e. some data associated with a second swath may be stored between the beginning and ending of storage associated with a first swath. As an alternative—particularly where the number of pipelines 204 is equal to the number of laser drivers 316—it may be advantageous to route the data to storage associated with laser driver 316 which will ultimately process the data. At block 512, where the pulse data is routed to an appropriate video unit (e.g. video laser drivers 214) reorder logic 210, 310 performs this function. Thus, pulse data associated with a raster line or row of pixels is sent to an appropriate video unit.

At block 514, the output from a video pipelines 410, 412 within the plurality of pipelines 406, 408 may be sent to two or more video units 420, 422. Additionally, the input to one video unit may come from two or more pipelines. At block 516, pulse data associated with raster lines may be sent to an appropriate video unit in a sequence different than the order by which the pulse data were produced. In particular, the color pulse data is produced in a first order determined by operation of the video pipelines 410, 412, and is sent to video units 420, 422 in a second order determined by the operation of those video units.

Although the disclosure has been described in language specific to structural features and/or methodological steps, it is to be understood that the appended claims are not limited to the specific features or steps described. Rather, the specific features and steps are exemplary forms of implementing this disclosure. For example, while several alternative implementations of hardware embodiments of parallel image processing have been illustrated, still further alternative designs could utilize the same concepts. And, while the implementations discussed have referred to color processing, in an alternative embodiment monochromatic or gray scale images could be processed using the techniques discussed. Additionally, while horizontal swaths, portions or segments of an image have been discussed, vertical segments of an image could similarly be used. Additionally, while use of a laser marking device is disclosed throughout the application, use of an inkjet nozzle, a screen controlling device or other output device could be substituted.

Additionally, while one or more methods have been disclosed by means of flow charts and text associated with the blocks, it is to be understood that the blocks do not necessarily have to be performed in the order in which they were presented, and that an alternative order may result in similar advantages.

The invention claimed is:

1. An image processor, comprising:
a plurality of processing pipelines, each configured to receive data associated with a portion of an image and to output pulse data associated with the portion;
a buffer to store the pulse data; and
logic to route the pulse data to an appropriate laser drive unit, wherein each processing pipeline is configured to produce the pulse data in a different order than an order in which the logic routes the pulse data.

2. The image processor of claim 1, additionally comprising:
a second buffer to store the data associated with the portion in a compressed device independent raster format; and
a networking device to distribute the data stored in the compressed device independent raster format to each processing pipeline contained within the plurality of processing pipelines.

3. The image processor of claim 1, wherein the logic is configured to distribute the pulse data output by a processing pipeline to at least two laser drive units.

4. The image processor of claim 1, wherein the pulse data is configured for operation of an output device selected from a group comprising a laser, an inkjet nozzle and a screen controlling device.

5. The image processor of claim 1, wherein the logic comprises a gate array having cross-switching logic and a DMA associated with each processing pipeline.

6. The image processor of claim 1, wherein a number of processing pipelines contained within the plurality of processing pipelines and a number of laser drive units within the image processor are not equal, and wherein the logic distributes output from two processing pipelines to one laser drive unit.

7. An image processor, comprising:
a plurality of video pipelines, each configured to receive data associated with a swath of an image and to output color pulse a data associated with the swath;
a buffer to store the color pulse data; and
data reorder logic to route the color pulse data to an appropriate video unit,
wherein each video pipeline is configured to produce the pulse data in a different order than an order in which the data reorder logic routes the color pulse data.

8. The image processor of claim 7, additionally comprising:
a second buffer to store the data associated with the swath in a compressed device independent raster format; and
a networking device to distribute the data stored in the compressed device independent raster format to each pipeline contained within the plurality of video pipelines.

9. The image processor of claim 7, wherein the data reorder logic is configured to distribute the color pulse data output by a video pipeline to at least two video units.

10. The image processor of claim 7, wherein the color pulse data is configured for operation of an output device selected from a group comprising a laser, an inkjet nozzle and a screen controlling device.

11. The image processor of claim 7, wherein the data reorder logic comprises a gate array having cross-switching logic and a DMA associated with each video pipeline.

12. The image processor of claim 7, wherein a number of video pipelines contained within the plurality of video pipelines and a number of video units within the image processor are not equal, and wherein the data reorder logic distributes output from two video pipelines to one video unit.

13. An imaging device, comprising:
a source of compressed data;
a parallel image processor, comprising:
a plurality of video pipelines, wherein each video pipeline is configured to receive compressed data associated with a swath of any image, and is configured to output color pulse data associated with the swath; and
data reorder logic to route the color pulse data to an appropriate video unit; and
a marking assembly comprising a plurality of lasers driven by video units within the parallel image processor.

14. The imaging device of claim 13, additionally comprising:
memory configured to store the color pulse data, wherein the color pulse data is written to the memory in a first order determined by production by the plurality of video pipelines and wherein the color pulse data is read from the memory in a second order determined by need of the appropriate video unit.

15. The imaging device of claim 13, additionally comprising:
a buffer to store the compressed data; and
a networking device to distribute the compressed data to each of the plurality of video pipelines.

16. The image processor of claim 1, wherein each of the plurality of processing pipelines is configured to receive compressed data associated with a portion of the image and to output pulse data associated with the portion.

17. The image processor of claim 16, wherein each processing pipeline is configured to decompress the compressed data to produce the pulse data.

18. The image processor of claim 1, wherein the portion of the image corresponds to a swath of the image.

19. The image processor of claim 7, wherein each of the plurality of video pipelines is configured to receive compressed data associated with the swath of the image and to output pulse data associated with the swath.

20. The image processor of claim 19, wherein each video pipeline is configured to decompress the compressed data to produce the color pulse data.

21. A method of processing an image, the method comprising:
distributing segments of data among a plurality of processing pipelines;
outputting pulse data associated with the plurality of segments from the plurality of processing pipelines;
storing the pulse data;
routing the pulse data to a laser drive unit;
segmenting the data into the segments; and
segmenting the pulse data associated with each segment into pulse data associated with each row of pixels, wherein routing further comprises sending the pulse data associated with each row of pixels to the laser drive unit.

22. The method of claim 21, wherein the data is compressed and wherein the method further comprises decompressing the compressed data to produce the pulse data.

23. The method of claim 22, wherein the pulse data is not routed in a sequence by which it is decompressed.

24. A method of processing an image, the method comprising:
- distributing swaths of data among a plurality of processing pipelines;
- outputting pulse data associated with the plurality of segments from the plurality of processing pipelines;
- storing the pulse data; and
- routing the pulse data to a video unit in a different order than an order in which the pulse data was output.

25. The method of claim 24 further comprising segmenting data into the swaths.

26. The method of claim 24, wherein the swaths include compressed data and wherein the method further comprises decompressing the compressed data to produce the pulse data.

27. A method of processing an image, the method comprising:
- distributing segments of compressed data among a plurality of processing pipelines;
- outputting pulse data associated with the plurality of segments from the plurality of processing pipelines;
- storing the pulse data;
- routing the pulse data to a laser drive unit; and
- decompressing the compressed data to produce the pulse data, wherein the pulse data is not routed in a sequence by which it is decompressed.

* * * * *

UNITED STATES PATENT AND TRADEMARK OFFICE
CERTIFICATE OF CORRECTION

PATENT NO. : 7,283,686 B2  Page 1 of 1
APPLICATION NO. : 10/413275
DATED : October 16, 2007
INVENTOR(S) : Bradley R. Larson et al.

It is certified that error appears in the above-identified patent and that said Letters Patent is hereby corrected as shown below:

In column 6, line 10, in Claim 13, after "swath of" delete "any" and insert -- an --, therefor.

Signed and Sealed this

Twenty-ninth Day of July, 2008

JON W. DUDAS
*Director of the United States Patent and Trademark Office*